United States Patent [19]

Ino et al.

[11] 4,203,849
[45] May 20, 1980

[54] APPARATUS FOR CLEANING WATER CONTAINING FOREIGN PARTICLES SUCH AS SUSPENDED MATTERS OR OIL

[76] Inventors: Haruko Ino; Risaburo Ino, both of 9-119, Shimogofuku-machi, Hakata-ku, Fukuoka, Japan

[21] Appl. No.: 630,395

[22] Filed: Nov. 10, 1975

[30] Foreign Application Priority Data

Nov. 14, 1974 [JP] Japan ............................ 49/138328[U]
Nov. 29, 1974 [JP] Japan ............................ 49/137982[U]

[51] Int. Cl.² ............................................. B01D 21/10
[52] U.S. Cl. .................................................. 210/522
[58] Field of Search .................. 210/521, 522, 523, 83, 210/84, 322

[56] References Cited

U.S. PATENT DOCUMENTS

| | | | |
|---|---|---|---|
| 1,946,414 | 2/1934 | Schmid | 210/521 X |
| 2,868,384 | 1/1959 | Puddington | 210/521 |
| 3,346,122 | 10/1967 | Cornelissen | 210/532 R X |
| 3,385,439 | 5/1968 | Bach | 210/522 |
| 3,844,944 | 10/1974 | Mercuri | 210/83 |
| 3,894,955 | 7/1975 | Forsell | 210/522 X |
| 3,898,164 | 8/1975 | Hsiung | 210/521 |

FOREIGN PATENT DOCUMENTS 895874  4/1944  France .................................. 210/521

Primary Examiner—William A. Cuchlinski, Jr.
Attorney, Agent, or Firm—Frank J. Jordan

[57] ABSTRACT

An improved type of apparatus capable of cleaning waste water containing suspended matter and oil includes a plurality of plates obliquely disposed in parallel within an inclined separation chamber forming inclined, oblique passages through which the waste water passes.

5 Claims, 14 Drawing Figures

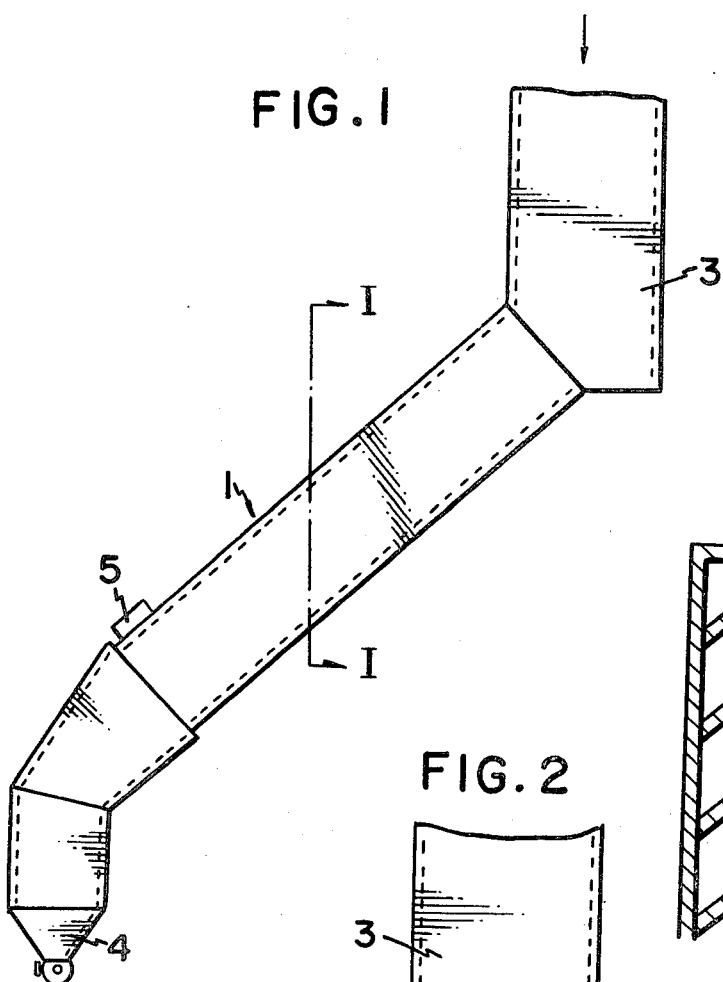
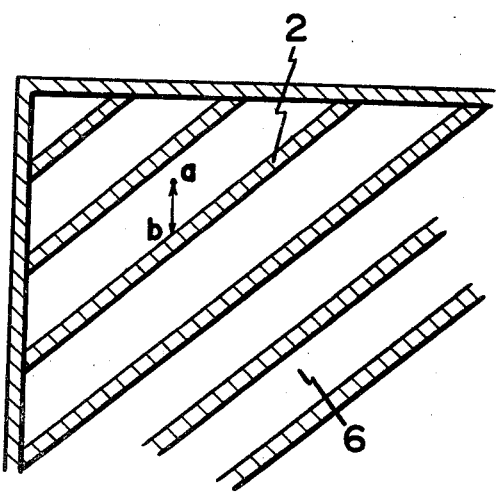
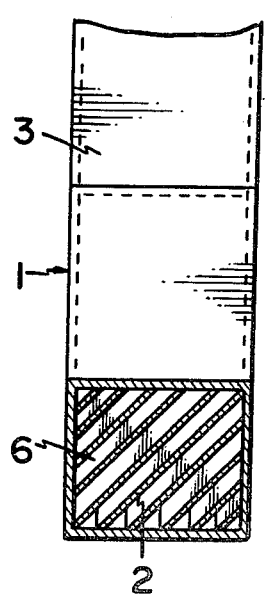
FIG. 1
FIG. 3
FIG. 2

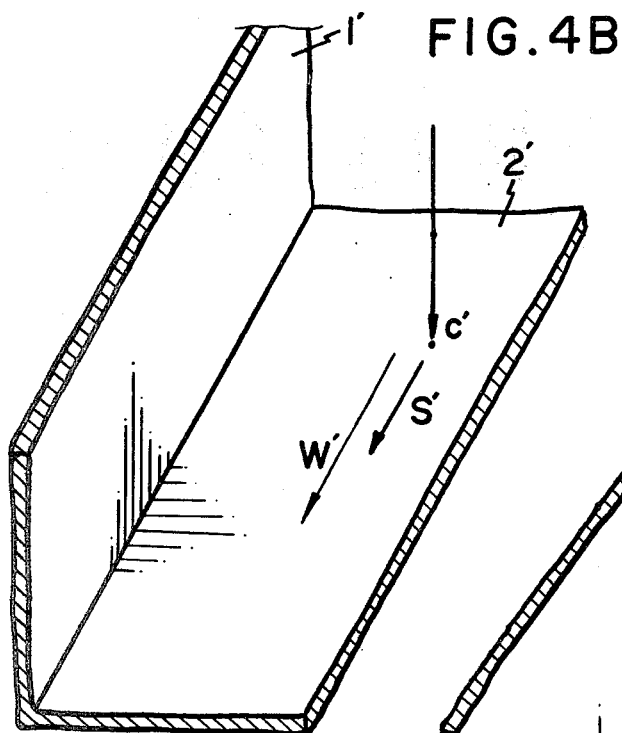
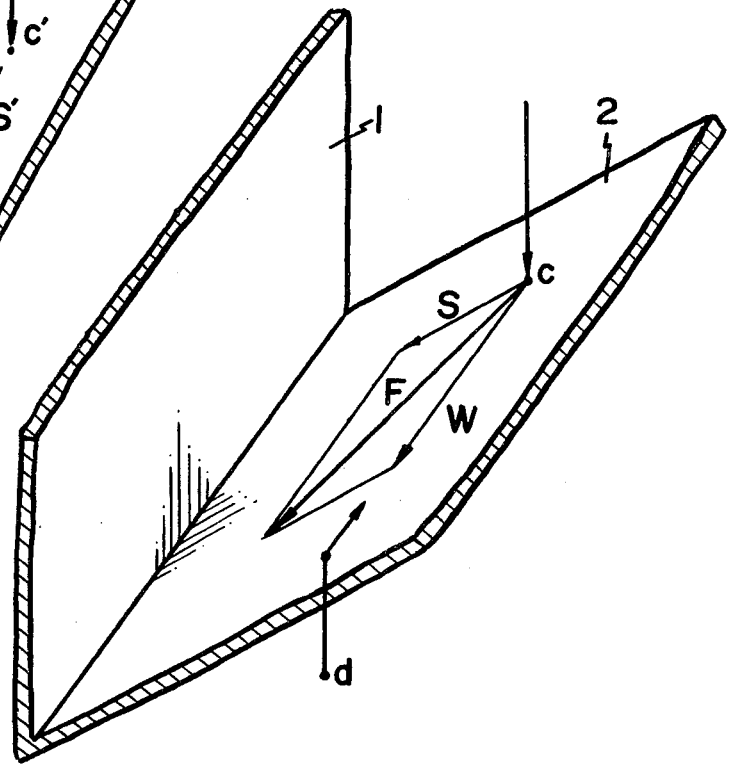
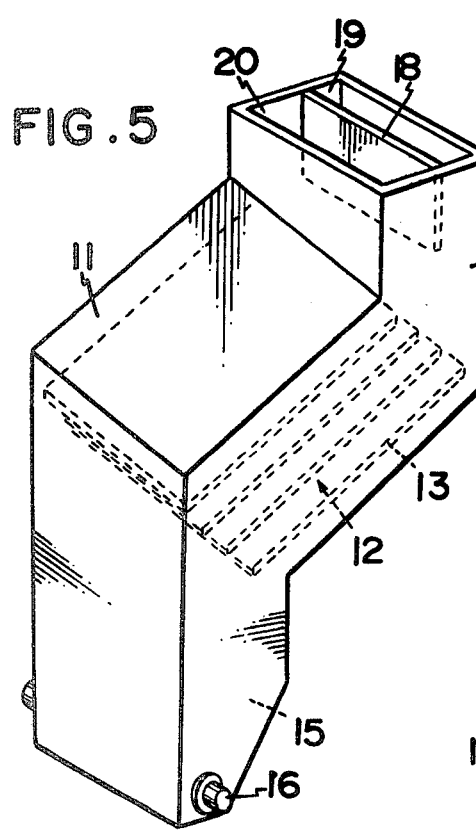
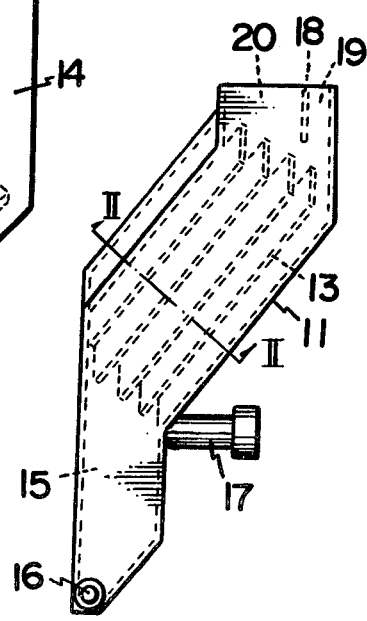
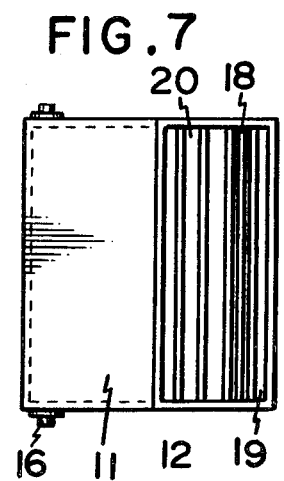

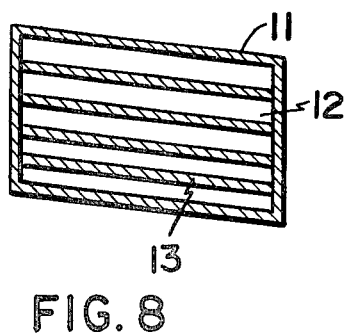
FIG. 8
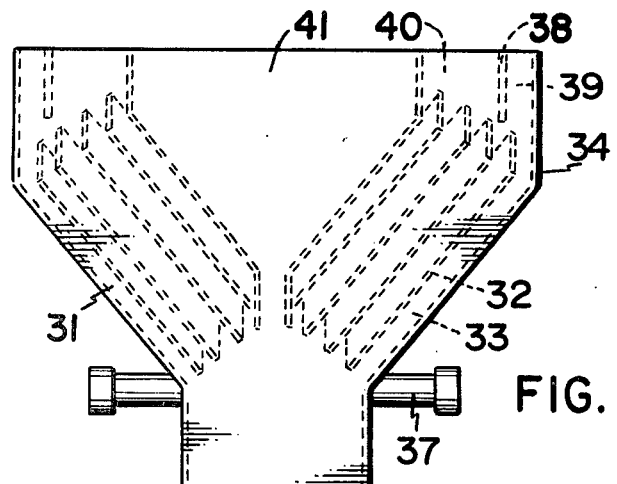
FIG. 9
FIG. 10
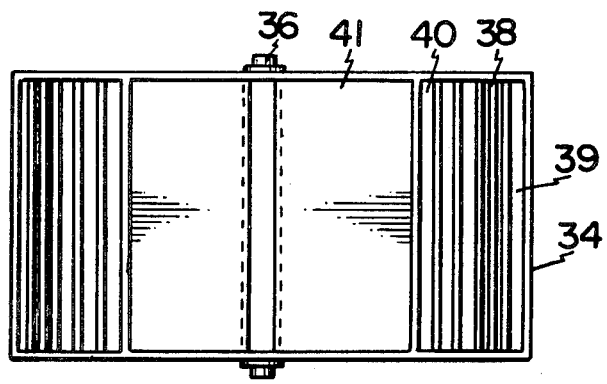
FIG. 11
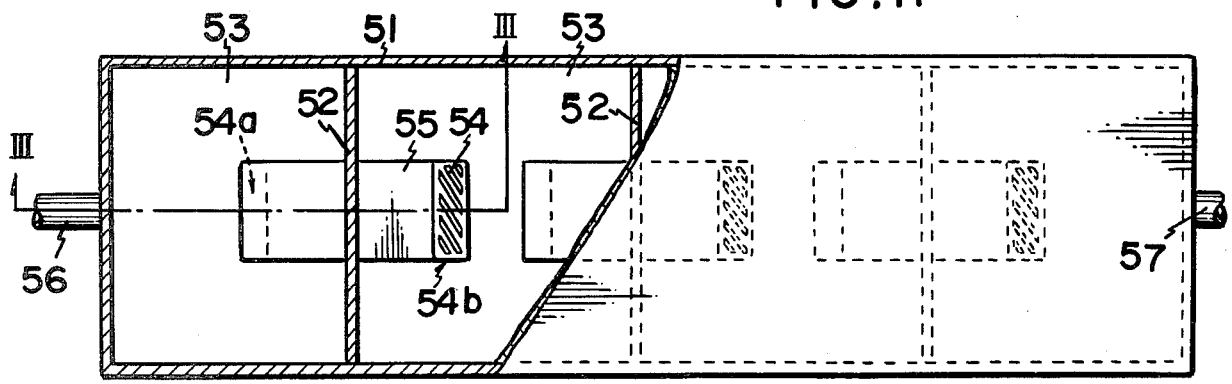
FIG. 12
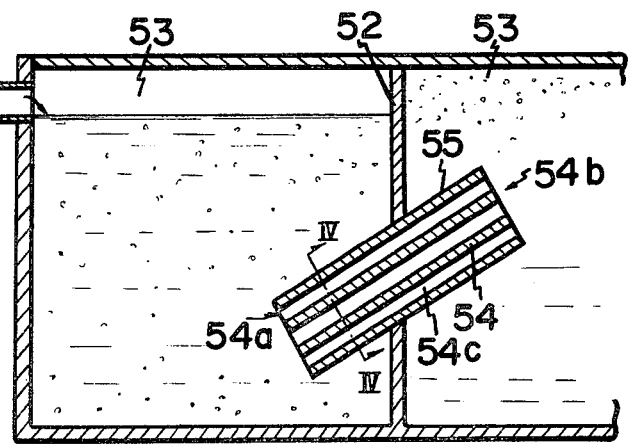
FIG. 13
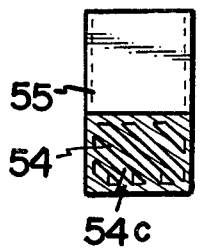

APPARATUS FOR CLEANING WATER CONTAINING FOREIGN PARTICLES SUCH AS SUSPENDED MATTERS OR OIL

BACKGROUND OF THE INVENTION

This invention relates to an apparatus for cleaning water containing suspended matter or oil in an efficient way.

Conventionally, apparatus for the above operation are divided into two groups wherein one group comprises apparatus which use coagulating agents and another group comprises apparatus which use no coagulating agents.

The apparatus which use coagulants are employed in big chemical plants or the like and are expensive to construct and maintain.

Although apparatus which use no coagulating agents are not complicated in structure and therefore are inexpensive to construct as well as to maintain, the purifying operation is far inferior to that of apparatus which use coagulating agents.

To solve the above problem, apparatus with a plurality of inclined partition plates that are disposed within the container of the apparatus have been developed. A brief explanation of the purifying operation of the above apparatus is that the suspended matter which is contained in the water drops onto the upper surface of each partition plate due to gravity and then slides along the surface. During the above movement, the suspended matter or particles increase in size since they combine with each other. As a result, the suspended matter is settled onto the bottom of the container whereby the water containing the suspended matter is purified. Generally speaking, this type of apparatus has been less than optimal in its performance.

It is an object of the present invention to provide an apparatus for cleaning water which contains suspended matter which is characterized by a plurality of inclined partition plates that are disposed in the container of the apparatus at regular intervals in such a way that the plates are slanted with respect to the horizontal and vertical planes.

It is another object of the present invention to provide an apparatus for cleaning water which contains oil as well as suspended matter which is characterized by having the above structure.

BRIEF DESCRIPTION OF THE DRAWINGS

FIG. 1 is a side view of an apparatus according to a first embodiment of this invention.

FIG. 2 is an enlarged cross sectional front view of the apparatus of FIG. 1 taken along the line I—I in FIG. 1.

FIG. 3 is an enlarged partial sectional view of FIG. 2 showing the falling movement of the suspended particle onto the surface of the partition plate.

FIG. 4A is an illustrative view of the partition plate of the first embodiment showing the movement of the suspended particle after it falls onto the surface of the partition plate.

FIG. 4B is an illustrative view of the partition plate of conventional apparatus showing the movement of the suspended particle after it falls onto the surface of the partition plate.

FIG. 5 is a perspective view of the apparatus of a second embodiment of this invention.

FIG. 6 is a side view of the apparatus in FIG. 5.

FIG. 7 is a plan view of the apparatus in FIG. 5.

FIG. 8 is a transverse cross-sectional view of the apparatus in FIG. 6 taken on line II—II in FIG. 6.

FIG. 9 is a front view of a modification of the apparatus of FIG. 5.

FIG. 10 is a plan view of the apparatus of FIG. 9.

FIG. 11 is a plan view of the apparatus of a third embodiment of this invention with a portion partly broken away and in section.

FIG. 12 is a longitudinal cross-sectional view of the apparatus in FIG. 11 taken on line III—III in FIG. 11.

FIG. 13 is a cross-sectional view of the communicating tube in FIG. 12 taken on line IV—IV in FIG. 12.

DETAILED DESCRIPTION OF THE INVENTION

The apparatus of this invention is disclosed hereinafter in the following embodiments in conjunction with the attached drawings.

FIRST EMBODIMENT

This embodiment relates to an apparatus for separating the suspended matters or particles from the water by settling the particles in an efficient way. The basic principle of this embodiment lies in the fact that the separation chamber is separated by a plurality of partition plates into a plurality of oblique passages which make the settling distance (that is the distance the particles travel before settling on the plates) of the suspended particle short and which also changes the direction of movement of the suspended particles relative to the direction of the water whereby the suspended particles are completely separated from the water.

In FIG. 1, numeral 1 indicates a separation chamber in which a plurality of oblique partition plates 2 are formed at regular spaced intervals to thereby define oblique passages 6. Numeral 3 indicates an introduction pipe into which the water containing the suspended particles as well as oil components is charged. Numeral 4 indicates a reservoir portion of the device where the particles which are separated from the water are gathered. Numeral 5 indicates an outlet from which the supernatant water is discharged and this outlet is connected to a suitable pumping means such as a non-illustrated power-operated pump.

The size and capacity of the apparatus of this invention can be varied corresponding to the amount of water to be treated. Furthermore the reservoir portion 4 or outlet 5 for the supernatant water may be attached to the suitable portion of the device and can be modified to correspond to the size and shape of the apparatus.

The manner in which this apparatus is operated is hereinafter disclosed with reference to the attached drawings.

The water containing the suspended particles as well as oil components is charged into the separation chamber 1 in such a way that after it is introduced into the introduction pipe 3 it passes through the plurality of inclined passages 6 and falls to the lower portion of the apparatus. During the movement of the water in one of the oblique passages, as shown in FIG. 3, a suspended particle drops to the upper surface of a partition plate 2, that is the distance from a to b, by the action of gravity.

As shown in FIG. 4A, the suspended particle c which falls onto the upper surface of the oblique plate 2 tends to move along the surface in a direction indicated by a vector S due to gravity.

Meanwhile the direction of the water is indicated by a vector W. It can be easily understood from the above relationship that the actual moving direction of the suspended particle can be indicated by a vector F. This implies that during the movement of the dirty water within the passage 6, the suspended particles take a different direction of motion from that of the water after dropping onto the upper surface of the plate 2. Therefore, the suspended particles are positively separated from the water due to the oblique partition plates 2.

Conventionally, apparatus have adopted inclined partition plates 2' as shown in FIG. 4B. However, since they are not disposed obliquely, as the plates of FIG. 4A, the direction of the suspended particle which is indicated by vector S' is the same as that of the water which is indicated by a vector W'. Therefore the suspended particles follow the flow of the water whereby the positive separation of the suspended particles from the water is not achieved.

Referring back to the apparatus of this invention, after the above movements which separate the suspended particles from the water are repeated for the required time throughout the length of the passages, the suspended particles are completely removed from the water and fall onto the reservoir portion 4 of the apparatus. The supernatant water passes through the outlet 5 which is generally attached to the end portion of the separation chamber 1.

After the above operation some oil components may be present in the supernatnat water. Such oil components will be separated from the water in such a way that an oil particle d in passage 6 will contact and adhers to the lower surface of partition plate 2 and move upwardly along the above surface as the lighter oil particle floats on the surface of the water.

According to this embodiment, the separation of suspended particles which have required a lengthy operational time as well as considerable space for the conventional apparatus can be performed quickly and efficiently.

SECOND EMBODIMENT

This embodiment as shown in FIGS. 5 to 8 relates an apparatus for seperating from discharged water oil components and suspended particles which may be settled out wherein the principle of operation of the device of this embodiment is the same as that of the first embodiment.

In FIG. 5 numeral 11 indicates an oblique rombic-shaped separation chamber in which a plurality of partition plates 12 are disposed at regular spaced intervals parallel to either the upper or lower plate of the chamber and which form a plurality of oblique passages 13. Numeral 14 indicates an introduction pipe the lower end of which communicates with separation chamber 11 so that the water which is introduced to the pipe 14 may be introduced to the chamber 11 smoothly. The lower end of the chamber 11 communicates with a reservoir portion 15 of the apparatus into which the water and the separated suspended particles fall separately after passing through the passages 13 formed in chamber 11. To the bottom of the reservoir portion 15, a tub means 16 is inserted. If the tub means 16 is removed, the settled suspended particles at the bottom of the reservoir portion 15 can be removed. Numeral 17 indicates an outlet for the supernatant water and is generally attached to the portion of the apparatus where the separation chamber 11 and the reservoir portion 15 meet. Numeral 18 is a partition plate which divides the introduction pipe 14 into an inlet 19 for the waste water and an oil outlet 20 from which oil that floats on the surface of the water is removed.

The manner in which this apparatus is operated is hereinafter disclosed with the aid of the accompanying drawings.

Refering to FIG. 5 through FIG. 8, the waste water which is charged into the apparatus through inlet 19 passes through the plurality of passages 13 formed in chamber 11.

During the above course of movement, suspended particles or matter move in the direction of the flow of the water after they fall onto the upper surface of the partition plates 12 in the same manner as described in the first embodiment. Thereby the suspended particles in the water are satisfactorily separated from the water after the repetition of the separation operation throughout the passages.

The separated particles fall onto the bottom of reservoir 15 and are taken out by removing tub means 16 while the supernatant water is discharged through outlet 17.

The oil components which are contained in the water adhere to the lower surfaces of the partition plates 12 and slide or pass upwardly along the above surfaces and then float on the surface of the water in the oil outlet 20.

FIGS. 8 and 9 show the modified apparatus of the second embodiment wherein the apparatus is shaped as though two apparatuses of the second embodiment were joined together back to front. In FIG. 9, 31 indicates a separation chamber into which a plurality of partition plates 32 are disposed forming a plurality of passages 33. Numeral 34 indicates an introduction pipe which is divided into an inlet 39 for the waste water and an oil outlet 40 by a separation plate 38. Numeral 35 is a reservoir portion of the apparatus where the debris is settled. A tub 36 is attached to the bottom of the reservoir 35. Numeral 37 indicates an outlet for the supernatant water while numeral 41 indicates another inlet for the waste water. According to this apparatus, the separation performance thereof is increased twofold and there is the further advantage that the waste water can be charged into the apparatus from the inlet 41.

According to the apparatus of this embodiment, it also has the advantage described in the first embodiment whereby oil and the suspended matters which are contained in waste water can be completely separated and cleaned and supernatant water can be discharged.

THIRD EMBODIMENT

This embodiment specifically relates to an apparatus for separating oil components from waste water.

Refering first to the construction of the apparatus of this embodiment in conjunction with FIG. 11 through FIG. 13, a container 51 is divided into a number of compartments 53 by a plurality of separation plates 52. Numeral 55 indicates inclined communicating tubes each of which is secured at the central portion to the separation plate 52, wherein the water of one compartment is transfered to the adjacent compartment. A plurality of partition plates 54 are disposed in the communicating chamber 55 at regular intervals forming a plurality of oblique passages 54c which are similar to that of the first embodiment. Numeral 56 indicates an introduction pipe from which the water containing oil particles is charged into the first compartment. Numeral 57 indicates an outlet from which the cleaned water is discharged.

The manner in which this apparatus is operated is described hereinafter in conjunction with the accompanying drawings.

The water containing oil components is charged into the first compartment by way of the introduction pipe 56. As the amount of water in the compartment 53 increases, water is introduced into the communicating tube 55 from the inlet 54a thereof.

In this embodiment, the flow of the waste water is always kept slow so that the water which passes through the passages 54c formed in chamber 55 always flows in a laminar manner.

During the above laminar flow of the water throughout passages 54c, the oil particles tend to come into contact with each other and merge resulting in oil particles which are considerably greater in size. These larger oil particles adhere to the lower surfaces of the partition plates 54 and continue to increase in size during their movement toward the upper end of the tube 55 along the lower surface of the partition plates 54. Then as the larger particles leave the upper end 54b of the tube 55, they move toward the surface of the water. In other words, the floating movement of the oil components is improved by passing the water into such passages 54c in such a way that the original oil particles merge together into oil particles of a greater size during their movement through the passages and they move upwards to the surface of the water remarkably faster than particles of the original size since they receive a bigger floating force from the water.

According to this embodiment, the waste water which can be charged into the first compartment of the apparatus can be cleaned to a degree corresponding to the number of communicating tubes 55 and is discharged from the outlet 57 of the container 51.

Additionally, if the lower surface of the partition plates 54 are coated with hydrophilic paint and the upper surface of each plate 54 is coated with lipophilic paint, the oil particles will adhere to the lower surface of the plates 54 and the water particles and the hydrophilic substances will adhere to the upper surface of the plates 54 whereby the flow speed of the water is decelerated which promotes the separation of the oil from the water.

Furthermore, the cleaning of the passages formed into the communicating tubes 55 can be easily and completely effected by reciprocating a cleaning means which has an outer configuration similar to that of the passage.

What is claimed is:

1. An apparatus for cleaning water containing foreign material such as suspended matter or oil comprising an introduction means into which said water is charged, an inclined separation chamber having one end connected to said introduction means, a reservoir having an inlet end, said chamber having its other end connected to the inlet end of said reservoir, said separation chamber having a plurality of oblique partition plates disposed at regular spaced intervals and forming a plurality of passages, said plates having an inclination corresponding generally to the inclination of said inclined separation chamber, said plates also having an inclination transverse to said inclination of said separation chamber, said reservoir having a bottom portion onto which suspended foreign material is settled, and an outlet attached to the bottom end of said separation chamber for discharging the clean water.

2. An apparatus according to claim 1 wherein said plates are substantially parallel to one another, said chamber having side walls, said plates being attached to said side walls.

3. An apparatus for cleaning water containing foreign material, especially oil components comprising a container consisting of a plurality of compartments formed by a plurality of separation plates, an inclined communicating tube having its lower end communicating with one of said compartments and its upper end communicating with another of said compartments, said tube having a central portion thereof secured to one of said separation plates, said tube having a plurality of oblique passages formed by a plurality of partition plates disposed in said tube at regular spaced intervals, said plates having an inclination corresponding generally to the inclination of said inclined communicating tube, said plates also having an inclination transverse to said inclination of said inclined communicating tube.

4. An apparatus according to claim 3, wherein an introduction pipe for supplying water to be treated is attached to a first compartment and an outlet pipe for discharging the clean water is attached to a last compartment.

5. An apparatus for cleaning water containing foreign material such as suspended matter or oil comprising a separation chamber, an introduction means for passing water into said separation chamber, said separation chamber having a first inclined section and a second inclined section, said first and second inclined sections being disposed in substantially V-shaped array, said first inclined section having a plurality of first oblique partition plates, said second inclined section having a plurality of second oblique partition plates, said first and second oblique partition plates being disposed in relative V-shaped array, said first and second oblique partition plates having an inclination corresponding generally to the inclination of its respective inclined chamber section, said first and second oblique partition plates also having an inclination transverse to said inclination of the respective inclined chamber section, a common reservoir receiving water from said first and second inclined sections of said separation chamber, said reservoir having a bottom portion into which the foreign material is settled, and an outlet attached to the bottom end of said separation chamber for discharging clean water.

* * * * *